United States Patent
Higashino et al.

(10) Patent No.: US 6,956,314 B2
(45) Date of Patent: Oct. 18, 2005

(54) ALTERNATOR

(75) Inventors: Kyoko Higashino, Tokyo (JP);
Toshiaki Kashihara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/867,749

(22) Filed: Jun. 16, 2004

(65) Prior Publication Data
US 2005/0168094 A1 Aug. 4, 2005

(30) Foreign Application Priority Data
Jan. 29, 2004 (JP) .............................. 2004-022080

(51) Int. Cl.⁷ ............................................ H02K 17/00
(52) U.S. Cl. ...................... 310/207; 310/189; 310/208
(58) Field of Search .............................. 310/179, 184, 310/189, 191, 203, 201, 208

(56) References Cited

U.S. PATENT DOCUMENTS

| | | | |
|---|---|---|---|
| 1,822,261 A | * 9/1931 | Apple | 310/201 |
| 1,826,295 A | * 10/1931 | Apple | 310/201 |
| 2,407,935 A | * 9/1946 | Perfetti et al. | 310/201 |
| 5,998,903 A | * 12/1999 | Umeda et al. | 310/179 |
| 6,049,154 A | * 4/2000 | Asao et al. | 310/201 |
| 6,124,660 A | * 9/2000 | Umeda et al. | 310/215 |
| 6,441,527 B1 | * 8/2002 | Taji et al. | 310/201 |

FOREIGN PATENT DOCUMENTS

JP 2001-231203 A 8/2003

* cited by examiner

Primary Examiner—Tran Nguyen
(74) Attorney, Agent, or Firm—Sughrue Mion, PLLC

(57) ABSTRACT

In an automotive alternator according to the present invention, a curved portion for adjusting a height of a joining portion coil end of an inner winding portion and a height of a joining portion coil end of an outer winding portion so as to be generally equal, and adjusting a height of a linking portion coil end of the inner winding portion and a height of a linking portion coil end of the outer winding portion so as to be generally equal is disposed on conductor segments of at least the inner winding portion.

4 Claims, 5 Drawing Sheets

ALTERNATOR

BACKGROUND OF THE INVENTION

1. Field of the Invention

The present invention relates to an automotive alternator mounted to an automotive vehicle such as a passenger car or a truck, for example, and particularly to a stator winding of a stator therefor.

2. Description of the Related Art

Conventionally, automotive alternators are known that include a rotor in which north-seeking (N) and south-seeking (S) poles are formed alternately in a direction of rotation; and a stator having a stator core surrounding the rotor, and a stator winding mounted in a plurality of slots formed so as to extend in an axial direction of the stator core at a distance from each other in a circumferential direction, wherein the stator winding is constructed such that a plurality of conductor segments are connected to each other, the conductor segments being formed into a general U shape composed of a pair of straight portions housed inside the slots, a linking portion linking these straight portions to each other, and joining portions disposed on tip portions of the straight portions and projecting outward from a first end surface of the stator core; and in the linking portions, which constitute a coil end of the stator winding, linking portions of first conductor segments cover linking portions of second conductor segments. (See Patent Literature 1, for example.)

Patent Literature 1

Japanese Patent Laid-Open No. 2001-231203 (Gazette: FIG. 2 to FIG. 6)

In such cases, because linking portions of first conductor segments cover linking portions of second conductor segments, one problem is that the covering linking portions constrict radial cooling passages in the coil ends, increasing resistance to a cooling airflow, and making cooling efficiency in the stator winding poor.

SUMMARY OF THE INVENTION

The present invention aims to solve the above problem and an object of the present invention is to provide an alternator enabling cooling of a stator winding to be improved by reducing resistance to a cooling airflow in coil ends.

In order to achieve the above object, according to one aspect of the present invention, a height adjusting portion for adjusting a height of a joining portion coil end of an inner winding portion and a height of a joining portion coil end of an outer winding portion so as to be generally equal, and adjusting a height of a linking portion coil end of the inner winding portion and a height of a linking portion coil end of the outer winding portion so as to be generally equal is disposed on conductor segments of at least the inner winding portion.

DETAILED DESCRIPTION OF THE PREFERRED EMBODIMENTS

Embodiment 1

Figure 1:
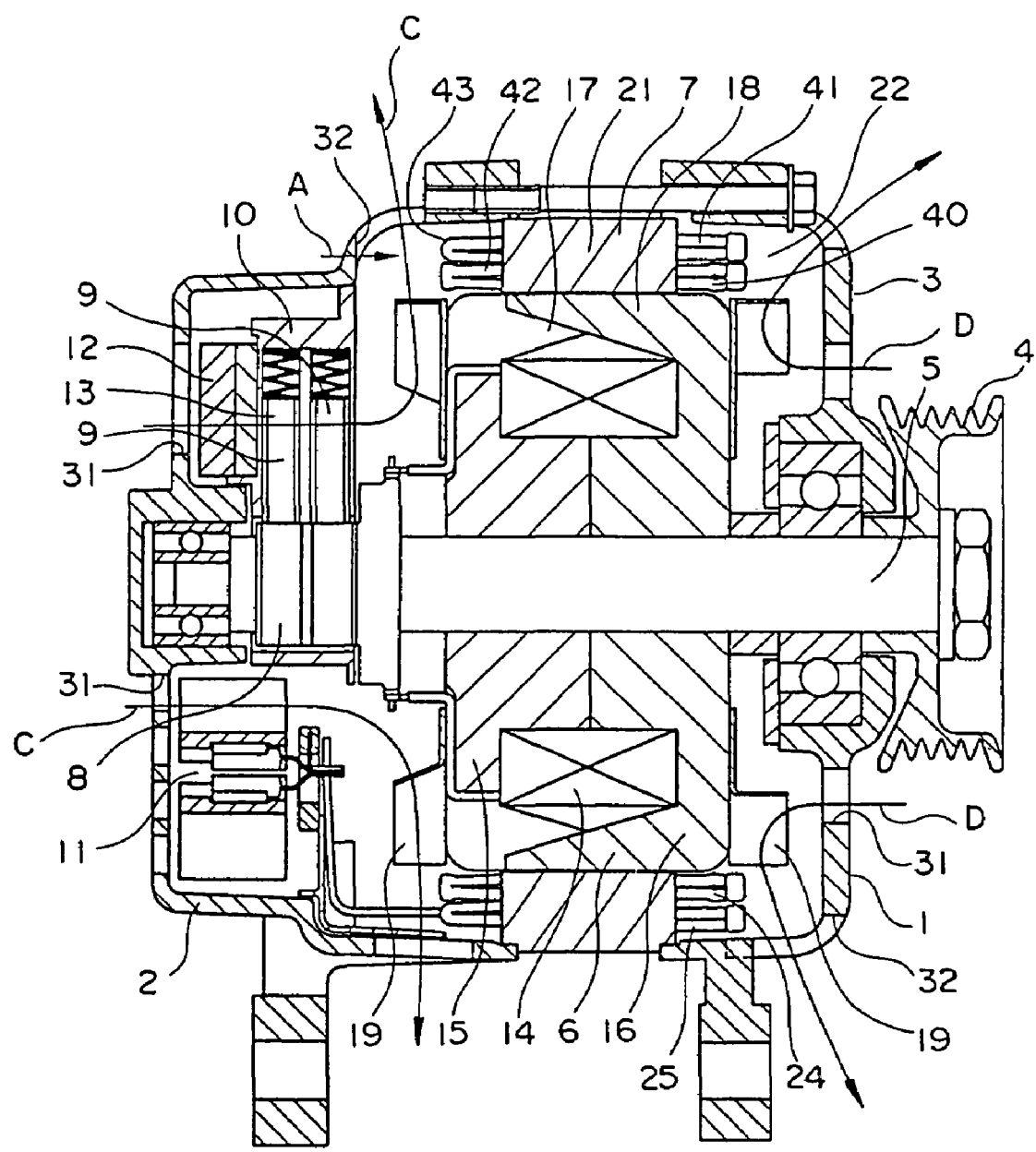
FIG. 1 is a cross section showing an automotive alternator according to Embodiment 1 of the present invention.
Figure 2:
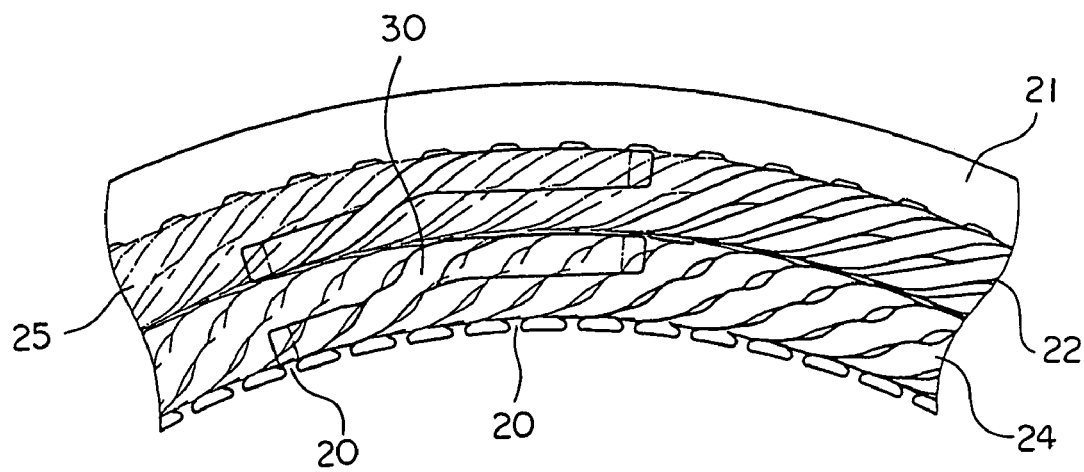
FIG. 2 is a diagram of a stator from FIG. 1 when viewed in a direction of arrows A.

FIG. 1 is a cross section showing an automotive alternator according to Embodiment 1 of the present invention, and FIG. 2 is a diagram of a stator 7 from FIG. 1 when viewed in a direction of arrow A.

This automotive alternator includes: a case 3 constituted by a front bracket 1 and a rear bracket 2 made of aluminum, a shaft 5 disposed inside the case 3, a pulley 4 being secured to a first end portion of the shaft 5; a Lundell-type rotor 6 secured to the shaft 5; a stator 7 secured to an inner wall surface of the case 3; slip rings 8 secured to a second end portion of the shaft 5 for supplying an electric current to the rotor 6; a pair of brushes 9 sliding in contact with the slip rings 8; a brush holder 10 housing the brushes 9; a rectifier 11 electrically connected to the stator 7 for converting an alternating current generated in the stator 7 into a direct current; and a regulator 13 fixed by adhesive to a heat sink 12 secured to the brush holder 10, the regulator 13 adjusting a magnitude of a voltage.

The rotor 6 is constituted by: a rotor coil 14 for generating a magnetic flux on passage of an electric current; and a pair of pole cores 15 and 16 disposed so as to cover the rotor coil 14, magnetic poles being formed in the pair of pole cores 15 and 16 by the magnetic flux generated by the rotor coil 14. The first and second pole cores 15 and 16 are made of iron, each having a plurality of first and second claw-shaped magnetic poles 17 and 18, respectively, disposed on an outer circumferential edge at a uniform angular pitch in a circumferential direction so as to project axially, and the first and second pole cores 15 and 16 are fixed to the shaft 5 facing each other such that the first and second claw-shaped magnetic poles 17 and 18 intermesh. In addition, centrifugal fans 19 are fixed to first and second axial end surfaces of the rotor 6.

The stator 7 is constituted by: an annular stator core 21 having a total of ninety-six (96) slots 20 formed so as to extend in an axial direction at a uniform pitch in a circumferential direction; and a stator winding 22 in which conducting wires are wound into this stator core 21 and an alternating current is generated by changes in the magnetic flux from the rotor 6 accompanying rotation of the rotor 6.

This stator winding 22 is constituted by a-phase stator winding portions, b-phase stator winding portions, and c-phase stator winding portions, disposed so as to be shifted in a circumferential direction by one slot from each other and star-connected to each other to form two three-phase stator windings.

Figure 3:
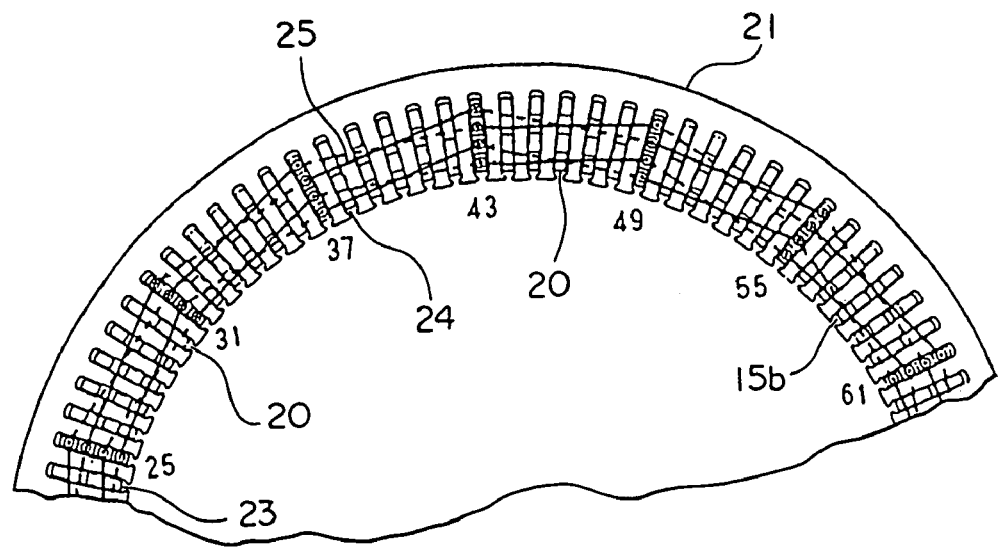
FIG. 3 is a partial connection diagram of a stator winding from FIG. 1.

FIG. 3 is a winding diagram for one of the a-phase stator winding portions 23; winding diagrams for the other a-phase stator winding portion, the b-phase stator winding portions, and the c-phase stator winding portions are not shown. Moreover, in this diagram, the solid lines in the figure represent the conducting wires at a rear bracket 2 end (linking portions of the conductor segments described below), and the broken lines represent the conducting wires at a front bracket 1 end (the joining portions of the conductor segments described below). The numerals written on an inner circumferential side of the stator core 21 in FIG. 3 represent slot numbers of the slots 20 of the stator core 21.

The a-phase stator winding portion 23 is constituted by an inner winding portion 24 and an outer winding portion 25.

In FIG. 3, the conducting wire of the inner winding portion 24 in a first position from an inner circumferential side of the slots 20 at slot number 31, for example, (hereinafter, the first position from the inner circumferential side is called Address 1, the second position Address 2, the third position Address 3, and the fourth position Address 4) extends in a clockwise direction from the rear bracket 2 end and enters a slot 20 at Address 2 of slot number 37, passes through the slot 20, and exits at the front bracket 1 end. Next, the conducting wire extends in a clockwise direction from the front bracket 1 end and enters a slot 20 at Address 1 of slot number 43, passes through the slot 20, and exits at the rear bracket 2 end. Finally, the conducting wire extends in a clockwise direction from the rear bracket 2 end and enters a slot 20 at Address 2 of slot number 49.

The conducting wire of the inner winding portion 24 in Address 1 of the slots 20 at slot number 25, for example, extends in a clockwise direction from the rear bracket 2 end and enters a slot 20 at Address 2 of slot number 31, passes through the slot 20, and exits at the front bracket 1 end. Next, the conducting wire extends in a clockwise direction from the front bracket 1 end and enters a slot 20 at Address 1 of slot number 37, passes through the slot 20, and exits at the rear bracket 2 end. Finally, the conducting wire extends in a clockwise direction from the rear bracket 2 end and enters a slot 20 at Address 2 of slot number 43.

Thus, in the inner winding portion 24, the conducting wires are wound around inside the slots 20 while being disposed repeatedly in an Address 1 layer and an Address 2 layer inside every sixth slot 20 skipping five slots in a circumferential direction from the Address 1 layer.

In FIG. 3, the conducting wire of an outer winding portion 25 in a Address 3 of the slots 20 at slot number 31, for example, extends in a clockwise direction from the rear bracket 2 end and enters a slot 20 at Address 4 of slot number 37, passes through the slot 20, and exits at the front bracket 1 end. Next, the conducting wire extends in a clockwise direction from the front bracket 1 end and enters a slot 20 at Address 3 of slot number 43, passes through the slot 20, and exits at the rear bracket 2 end. Finally, the conducting wire extends in a clockwise direction from the rear bracket 2 end and enters a slot 20 at Address 4 of slot number 49.

In FIG. 3, the conducting wire of the outer winding portion 25 in Address 3 of the slots 20 at slot number 25, for example, extends in a clockwise direction from the rear bracket 2 end and enters a slot 20 at Address 4 of slot number 31, passes through the slot 20, and exits at the front bracket 1 end. Next, the conducting wire extends in a clockwise direction from the front bracket 1 end and enters a slot 20 at Address 3 of slot number 37, passes through the slot 20, and exits at the rear bracket 2 end. Finally, the conducting wire extends in a clockwise direction from the rear bracket 2 end and enters a slot 20 at Address 4 of slot number 43.

Thus, in the outer winding portion 25, the conducting wires are wound around inside the slots 20 while being disposed repeatedly in an Address 3 layer and an Address 4 layer inside every sixth slot 20 skipping five slots in a circumferential direction from the Address 3 layer.

Moreover, the other a-phase stator winding portion, the b-phase stator winding portions, and the c-phase stator winding portions are similar to the a-phase stator winding portion 23, and explanation thereof will be omitted.

Figure 4:
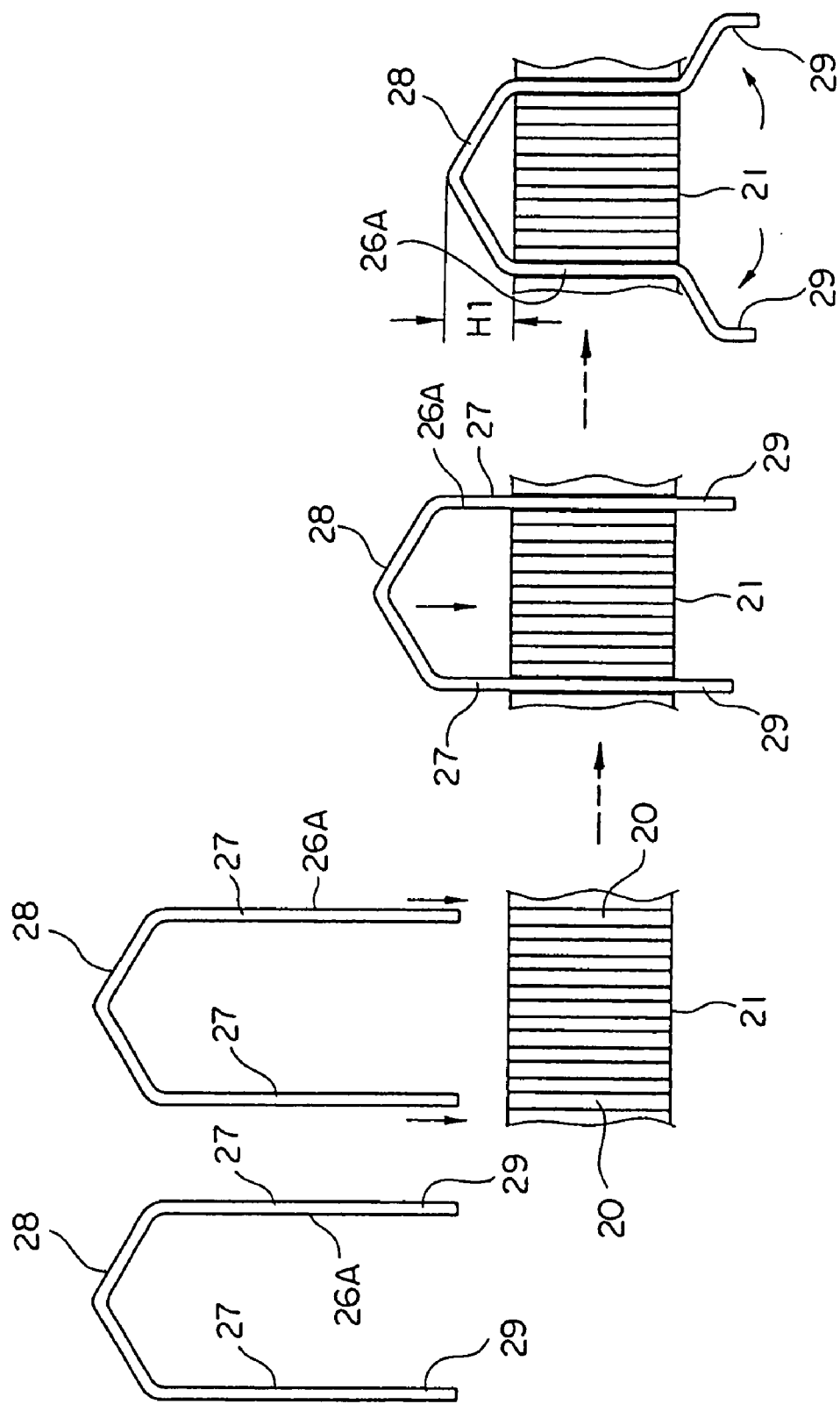
FIG. 4 is a diagram showing states of conductor segments in an outer winding portion inserted into slots of a stator core until joining portions are deformed.
Figure 5:
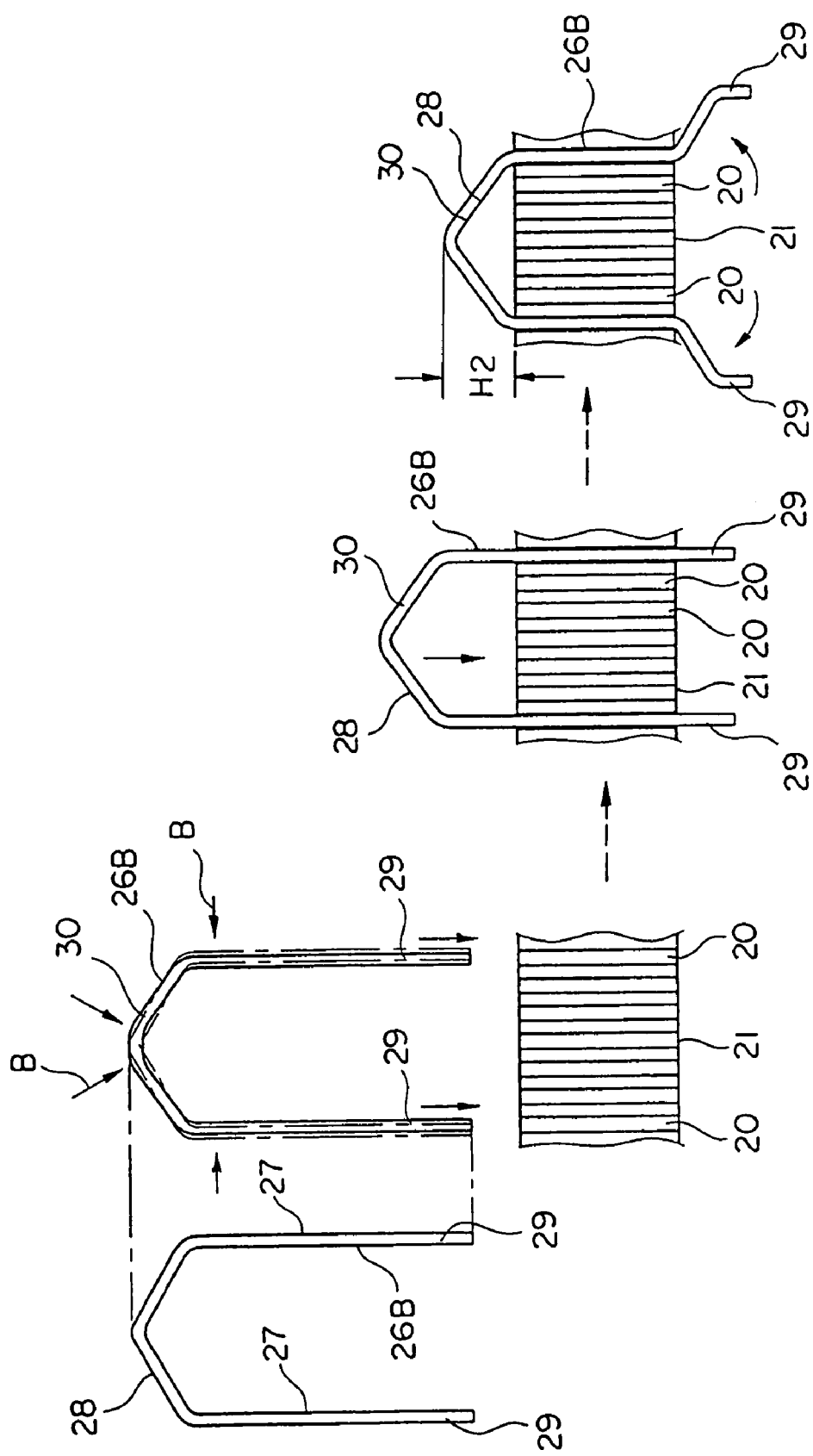
FIG. 5 is a diagram showing states of conductor segments in an inner winding portion inserted into slots of a stator core until joining portions are deformed.

The outer winding portion 25 is constructed by connecting conductor segments 26A, as shown in FIG. 4. The inner winding portion 24 is constructed by connecting conductor segments 26B, as shown in FIG. 5. An overall conductor segment length of the conductor segments 26A when straight is equal to an overall conductor segment length of the conductor segments 26B when straight.

The conductor segments 26A and 26B, which constitute structural elements of the conducting wires, are made of a copper wire material having a round cross-sectional shape coated with an electrical insulator shaped into a general U shape, and are each constituted by: a pair of straight portions 27 housed inside the slots 20; a linking portion 28 linking the straight portions 27 to each other; and joining portions 29 disposed on tip portions of the straight portions 27 and spread outward to join adjacent conductor segments 26A and 26B to each other.

The inner winding portion 24 is disposed radially inward compared to the outer winding portion 25, and the distance between the slots 20 in a circumferential direction is proportionately shorter. Because the conductor segments 26A and 26B are conductor segments of identical length, if a projecting length projecting outward from a first end surface of the stator core 21 near the joining portions 29 is equal in both the inner winding portion 24 and the outer winding portion 25, without modification the projecting length of the linking portions 28 of the inner winding portion 24 projecting outward from a second end surface of the stator core 21 will be longer than that of the outer winding portion 25.

In this embodiment, a curved portion 30 having a curved shape constituting a height adjusting portion for adjusting a height H2 of the inner winding portion 24 from the second end surface of the stator core 21 to the leading ends of the linking portion 28 so as to be equal to a height H1 of the outer winding portion 25 from the second end surface of the stator core 21 to the leading ends of the linking portion 28 is formed on each of the conductor segments 26B of the inner winding portion 24.

Next, a procedure for forming an a-phase stator winding portion 23 using the conductor segments 26A and 26B will be explained.

First, first straight portions 27 of the conductor segments 26A and 26B and second straight portions 27 six slots away are inserted from the rear bracket 2 end into predetermined slot numbers and addresses, four straight portions 27 of the conductor segments 26A and 26B being arranged so as to line up radially in a single column in each of the slots 20.

In this case, because the conductor segments 26B of the inner winding portion 24 are disposed radially inward compared to the conductor segments 26A of the outer winding portion 25, making the distance between the slots 20 in a circumferential direction proportionately shorter, they are inserted into the slots 20 while being deformed, as indicated by the arrows B in FIG. 5.

Thereafter, the joining portions 29 projecting outward from the straight portions 27 at the front bracket 1 end and the joining portions 29 projecting outward from straight portions 27 six slots away are joined together at the front bracket 1 end, as indicated by the broken lines in the winding diagram in FIG. 3, forming a four-turn a-phase stator winding portion 23. Moreover, as can be seen from the broken lines in FIG. 3, in the inner winding portion 24, each of the joining portions 29 of the conductor segments 26 projecting outward at the front bracket 1 end from Address 1 inside the slots 20 are joined together at the front bracket 1 end with the respective joining portions 29 of the conductor segments 26 projecting outward at the front bracket 1 end from Address 2 inside slots 20 six slots away in a counterclockwise direction. Each of the joining portions 29 of the conductor segments 26 projecting outward at the front bracket 1 end from Address 2 inside the slots 20 are joined together at the front bracket 1 end with the respective joining portions 29 of the conductor segments 26 projecting outward at the front bracket 1 end from Address 1 inside slots 20 six slots away in a clockwise direction.

As can be seen from the broken lines in FIG. 3, in the outer winding portion 25, each of the joining portions 29 of the conductor segments 26 projecting outward at the front bracket 1 end from Address 3 inside the slots 20 are joined together at the front bracket 1 end with the respective joining portions 29 of the conductor segments 26 projecting outward at the front bracket 1 end from Address 4 inside slots 20 six slots away in a counterclockwise direction. Each of the joining portions 29 of the conductor segments 26 projecting outward at the front bracket 1 end from Address 4 inside the slots 20 are joined together at the front bracket 1 end with the respective joining portions 29 of the conductor segments 26 projecting outward at the front bracket 1 end from Address 3 inside slots 20 six slots away in a clockwise direction.

Tip portions of the joining portions 29 of the conductor segments 26A and 26B are superposed radially at a position generally midway between the pairs of slots 20 in which the conductor segments 26 are inserted to facilitate a bending process, a clamp is wound on, then the tip portions are welded to each other with solder.

In this manner, in the inner winding portion 24, a joining portion coil end 40 is formed in which a plurality of connection portions in which tip portions of the joining portions 29 are connected to each other are each arranged in a row in a circumferential direction.

In the outer winding portion 25, a joining portion coil end 41 is formed in which a plurality of connection portions in which tip portions of the joining portions 29 are connected to each other are each arranged in a row in a circumferential direction.

In the inner winding portion 24, a linking portion coil end 42 is formed in which a plurality of linking portions 28 are each arranged in a row in a circumferential direction.

In the outer winding portion 25, a linking portion coil end 43 is formed in which a plurality of linking portions 28 are each arranged in a row in a circumferential direction.

Another a-phase stator winding portion, b-phase stator winding portions, and c-phase stator winding portions each having four turns are formed in a similar manner, and then these phase stator winding portions are star-connected to form three-phase stator windings.

In an automotive alternator constructed in this manner, an electric current is supplied to the rotor coil 14 from a battery (not shown) by means of the brushes 9 and the slip rings 10, generating a magnetic flux. The claw-shaped magnetic poles 17 in the first pole core 15 are magnetized into north-seeking (N) poles by this magnetic flux, and the claw-shaped magnetic poles 18 in the second pole core 16 are magnetized into south-seeking (S) poles. At the same time, rotational torque from an engine is transmitted to the shaft 5 by means of a belt (not shown) and the pulley 4, rotating the rotor 6. Thus, a rotating magnetic field is imparted to the stator winding 22, generating an electromotive force in the stator winding 22. This alternating-current electromotive force passes through the rectifier 11 and is converted into a direct current, the magnitude thereof is adjusted by the regulator 13, and the battery is charged.

Due to rotation of the centrifugal fans 19 secured to the first and second axial end surfaces of the rotor 6, at the rear bracket 2 end, external air is drawn in through the rear-end air intake apertures 31, cooling the rectifiers 11 and the regulator 13, is then deflected centrifugally by the centrifugal fans 19, cooling the linking portion coil ends 42 and 43 of the stator winding 22, and is discharged externally through the rear-end air discharge apertures 32, as indicated by arrows C in FIG. 1. At the front bracket 1 end, external air is drawn in through the front-end air intake apertures 31, is then deflected centrifugally by the centrifugal fans 19, cooling the joining portion coil ends 40 and 41 of the stator winding 22, and is discharged externally through front-end air discharge apertures 32, as indicated by arrows D in FIG. 1.

In an automotive alternator according to this embodiment, the height H2 of the conductor segments 26B of the inner winding portion 24 from the end surface of the stator core 21 to the leading ends of the linking portion 28 is identical around an entire circumference, the height H1 of the conductor segments 26A of the outer winding portion 25 from the end surface of the stator core 21 to the leading ends of the linking portion 28 is identical around an entire circumference, and the height H1 and the height H2 are made identical by forming the curved portions 30 on the linking portions 28 of the conductor segments 26B.

Consequently, resistance to the cooling airflow in the linking portion coil ends 42 and 43 of the stator winding 22, which are at the rear bracket 2 end, is reduced, enabling cooling of the stator winding 22, the rectifier 11, and the regulator 13 to be improved.

Furthermore, the overall length of the conductor segments 26B constituting the inner winding portion 24 is identical to the overall length of the conductor segments 26A constituting the outer winding portion 25, enabling a single specification for the conductor segments in both the conductor segments 26A and the conductor segments 26B before reshaping, thereby reducing manufacturing costs.

Figure 6:
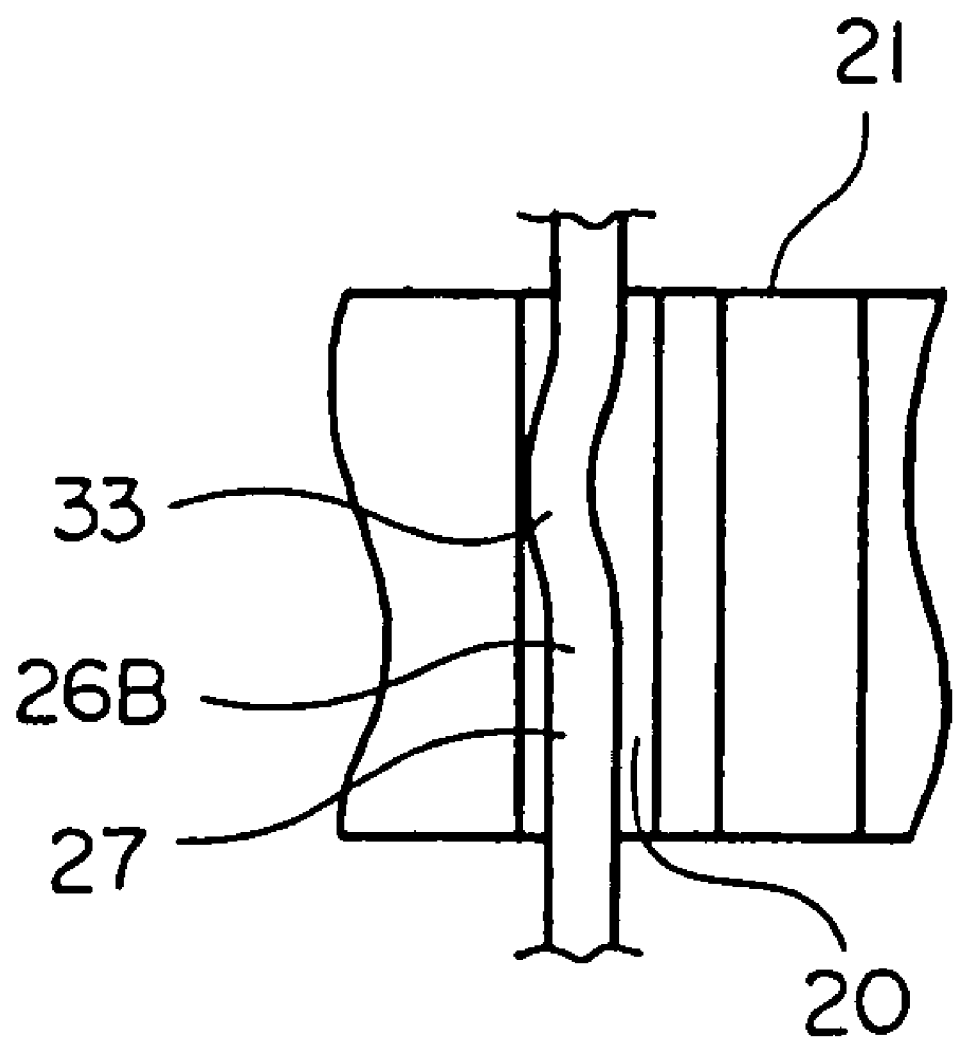
FIG. 6 is a diagram showing another example of a height adjusting portion of a conductor segment.

Moreover, the height H2 of the conductor segments 26B of the inner winding portion 24 from the end surface of the stator core 21 to the leading ends of the linking portion 28 may also be aligned with the height H1 of the conductor segments 26A of the outer winding portion 25 from the end surface of the stator core 21 to the leading ends of the linking portion 28 by forming curved portions 33 constituting a height adjusting portion on each of the pair of straight portions 27 of the conductor segments 26B of the inner winding portion 24, as shown in FIG. 6.

Curved portions each constituting a height adjusting portion may also be formed on the linking portion and the pair of straight portions of the conductor segments of the inner winding portion.

In addition, the height of the coil ends of the inner winding portion and the height of the coil ends of the outer winding portion may also be made identical by forming a curved portion constituting a height adjusting portion on the conductor segments of the inner winding portion, and forming a curved portion constituting a height adjusting portion having a smaller radius of curvature on the conductor segments of the outer winding portion.

Furthermore, curved portions are formed as the height adjusting portion, but of course the present invention is not limited to this shape, provided that it is a rounded shape that absorbs the height of the linking portion coil ends of the inner winding portion.

Still furthermore, it is not absolutely necessary for the height of the conductor segments of the inner winding portion from the end surface of the stator core to the leading ends of the linking portion and the height of the conductor segments of the outer winding portion from the end surface of the stator core to the leading ends of the linking portion to be identical around the entire circumference, and in that case resistance to the cooling airflow in the linking portion coil ends is still reduced, enabling cooling of the stator winding, the rectifier, and the regulator to be improved.

A three-phase stator winding 22 in which the conductors make four turns is explained, but if high output is further required at low speed, the number of turns of the conducting wires may also be six turns or eight turns. Moreover, in the case of six turns, for example, it is necessary for the height adjusting portion to be disposed on the conductor segments of at least the inner winding portion and an intermediate winding portion, in order to align them with the height of the linking portion coil ends of the outer winding portion.

The present invention is not limited to automotive alternators, and can also be applied to alternators for outboard motors, for example.

What is claimed is:

1. An alternator comprising:
   a rotor in which north-seeking (N) and south-seeking (S) poles are formed alternately in a direction of rotation;
   a fan disposed on at least one axial end surface of said rotor; and
   a stator having:
      a stator core surrounding said rotor; and
      a stator winding mounted in a plurality of slots formed so as to extend in an axial direction of said stator core at a distance from each other in a circumferential direction,
   said stator winding being constructed such that a plurality of conductor segments are connected to each other, said conductor segments each being formed into a substantial U shape composed of a pair of straight portions housed inside said slots, a linking portion linking said straight portions to each other, and joining portions disposed on tip portions of said straight portions and projecting outward from a first end surface of said stator core,
   said stator winding being constituted by:
   an inner winding portion comprising:
      a joining portion coil end having a plurality of connection portions in which a joining portion of said conductor segments projecting outward from a radially innermost layer inside said slots and a joining portion of said conductor segments projecting outward from a layer immediately outside said radially innermost layer in slots a predetermined number of slots away in a circumferential direction are connected, and said plurality of connection portions are each arranged in a row in a circumferential direction; and
      a linking portion coil end in which said linking portions of a plurality of said conductor segments projecting outward at a second end surface of said stator core from a radially innermost layer inside said slots and a layer immediately outside said radially innermost layer in slots a predetermined number of slots away in a circumferential direction are each arranged in a row in a circumferential direction; and
   an outer winding portion comprising:
      a joining portion coil end having a plurality of connection portions in which a joining portion of said conductor segments projecting outward from a radially outermost layer inside said slots and a joining portion of said conductor segments projecting outward from a layer immediately inside said radially outermost layer in slots a predetermined number of slots away in a circumferential direction are connected, and said plurality of connection portions are each arranged in a row in a circumferential direction; and
      a linking portion coil end in which said linking portions of a plurality of said conductor segments projecting outward at a second end surface of said stator core from a radially outermost layer inside said slots and a layer immediately inside said radially outermost layer in slots a predetermined number of slots away in a circumferential direction are each arranged in a row in a circumferential direction,
   wherein:
   a height adjusting portion for adjusting a height of said joining portion coil end of said inner winding portion and a height of said joining portion coil end of said outer winding portion so as to be substantially equal, and adjusting a height of said linking portion coil end of said inner winding portion and a height of said linking portion coil end of said outer winding portion so as to be substantially equal is disposed on said conductor segments of at least said inner winding portion.

2. The alternator according to claim 1, wherein:
   said height adjusting portion is a curved portion having a curved shape formed on said linking portion.

3. The alternator according to claim 1, wherein:
   said height adjusting portion is a curved portion having a curved shape formed on said straight portions.

4. The alternator according to claim 1, wherein:
   said height of said joining portion coil end of said inner winding portion and said height of said joining portion coil end of said outer winding portion are equal around an entire circumference, and said height of said linking portion coil end of said inner winding portion and said height of said linking portion coil end of said outer winding portion are equal around an entire circumference.

* * * * *